Oct. 16, 1962     M. M. HURST     3,058,433
CONVEYOR FOR VEHICLES
Filed Dec. 23, 1959     2 Sheets-Sheet 1
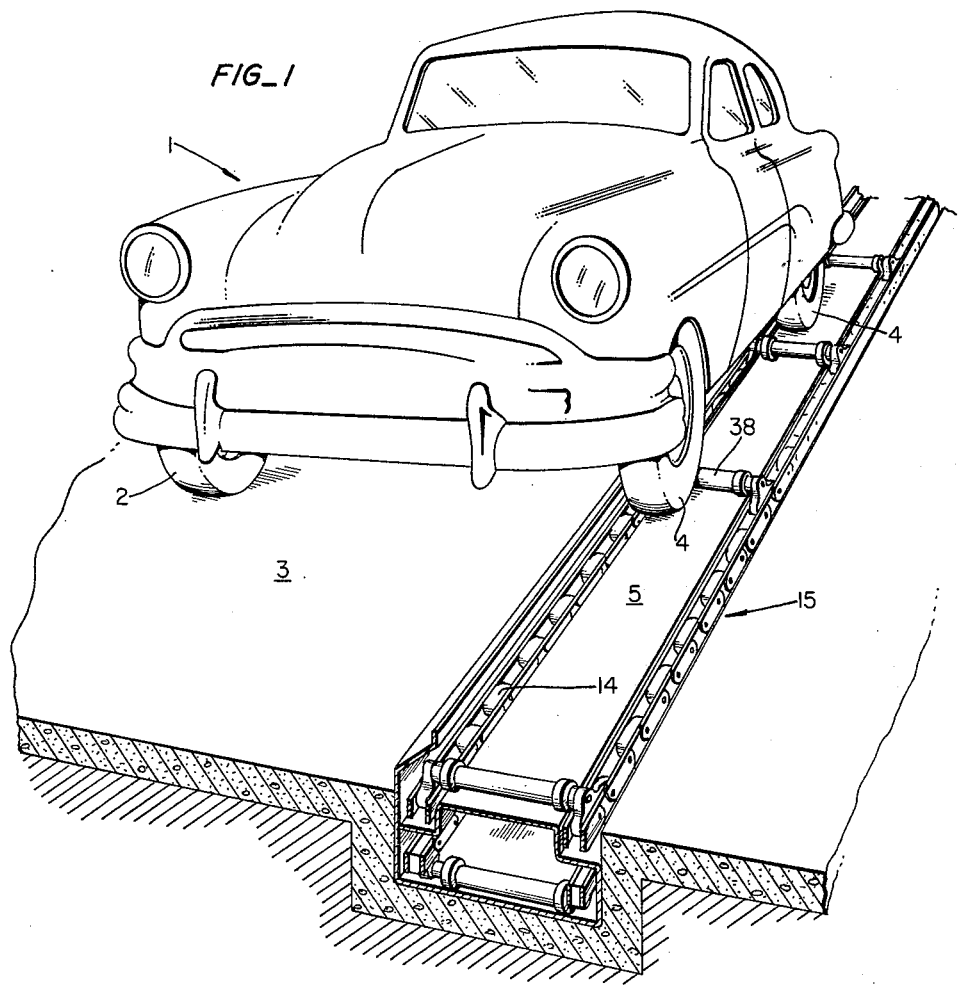
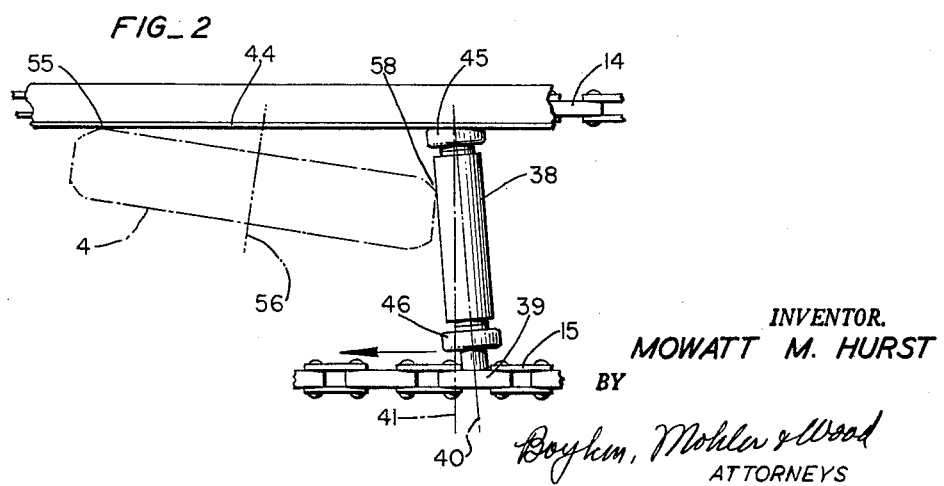
INVENTOR.
MOWATT M. HURST
BY
Boykin, Mohler & Wood
ATTORNEYS

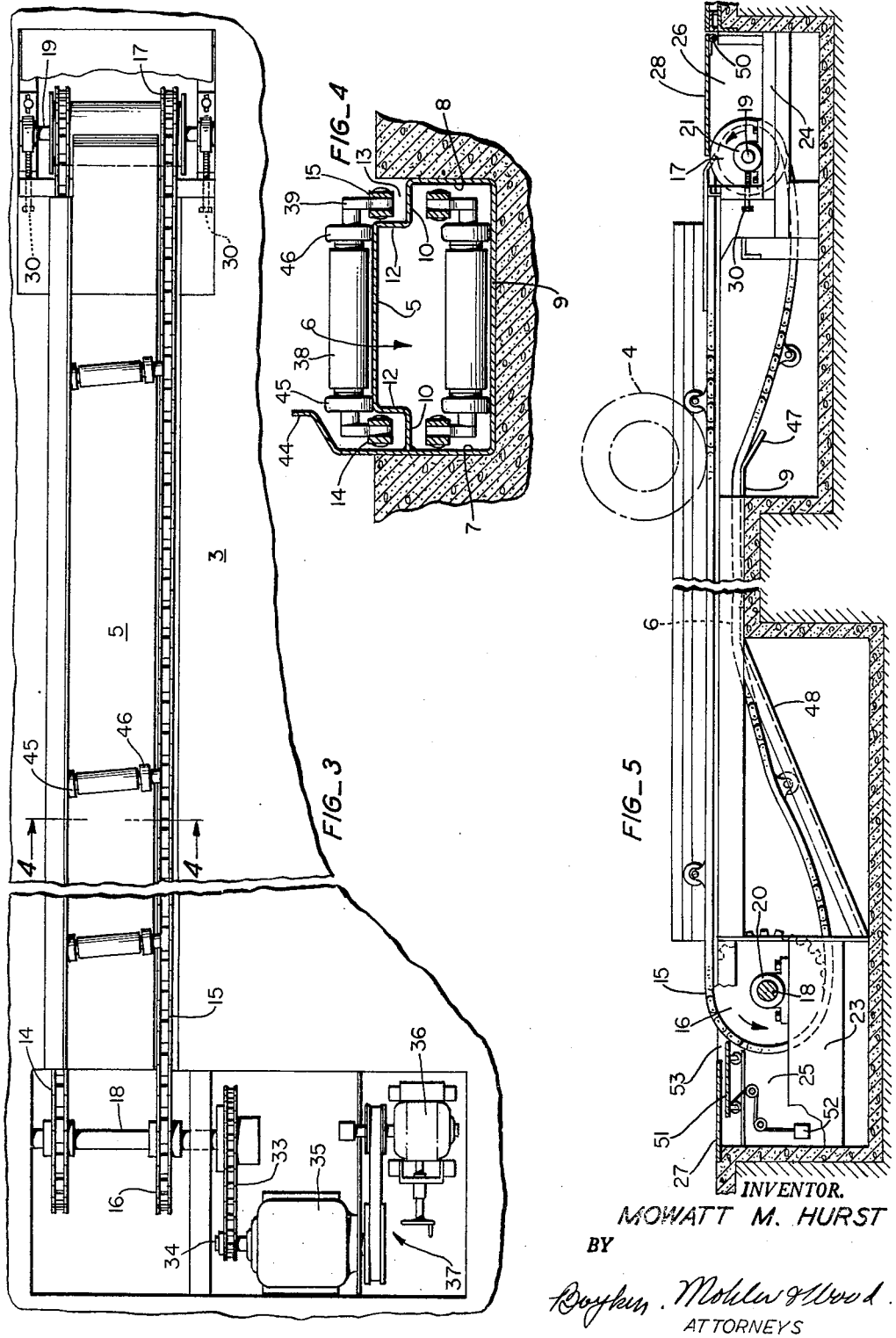

United States Patent Office 3,058,433
Patented Oct. 16, 1962

3,058,433
CONVEYOR FOR VEHICLES
Mowatt M. Hurst, 946 Bransten Road, San Carlos, Calif.
Filed Dec. 23, 1959, Ser. No. 861,522
9 Claims. (Cl. 104—172)

This invention relates to conveyors, generally, and more specifically to a conveyor of the endless chain type that is adapted to push a vehicle, such as an automobile along a predetermined path of travel.

Heretofore, in installations such as automatic automobile laundries, it has been customary to provide parallel guide rails or strips for guiding the wheels of the vehicle along a path of travel through the laundry. These may in some instances be spaced apart according to the wheel gauge, or spacing between the coaxial wheels, hence at least two guide strips have heretofore been required for vehicles having wheels of the same spacing.

In other instances a pair of parallel guide strips may form a gutter or channel for guiding the wheels at one of the sides of the vehicle, and a special plate or platform supports the other wheels at the other side of the vehicle.

Irrespective of which structure is employed, provision in the way of at least one pair of guide strips or rails has been found necessary.

With the advent of smaller automobiles in which the coaxial wheels are closer together than heretofore, and with the late introduction of vehicles in which the coaxial wheels are spaced apart a greater distance than has heretofore been standard, additional guide strips have usually been added, with a corresponding added expense.

One of the objects of the present invention is the provision of a method of moving vehicles, and a structure, whereby vehicles having their coaxial wheels spaced any distance apart may be guided along a predetermined path of travel by employment of a single guide strip or rail, and a simple pusher that is adapted to engage only one of the front wheels of the vehicle.

Another object of the invention is the provision of a vehicle moving apparatus that is more economical to make and install than heretofore.

Other objects and advantages will appear in the description and drawings.

In the drawings,

FIG. 1 is a perspective view of an automobile being moved along a path of travel by the method and apparatus of this invention;

FIG. 2 is a fragmentary top plan view of the tire engaging portion of the invention with the tire adapted to be engaged indicated in dot-dash lines;

FIG. 3 is a top plan view of the conveyor adapted to move the vehicle, the view being broken away in length to accommodate it to the sheet;

FIG. 4 is an enlarged sectional view taken along line 4—4 of FIG. 3;

FIG. 5 is a vertical sectional view taken longitudinally of FIG. 3 showing the conveyor in elevation.

In detail, the vehicle illustrated is an automobile generally designated 1 (FIG. 1). The wheels 2 of this vehicle, at one side thereof are adapted to be supported on the floor 3 of the laundry, or elsewhere for rolling thereover free from any guide means whatsoever in engagement therewith.

The other wheels 4 at the other side of the vehicle are adapted to be supported on a flat elongated runway or platform 5 the upper surface of which is substantially coplanar with the upper surface of the floor 3.

The platform 5, itself, may constitute the upper wall of a horizontally elongated tunnel, generally designated 6, having opposed vertical sidewalls 7, 8 (FIG. 4) and a bottom wall 9. Preferably the top sides and bottom of the tunnel are of metal, and are integrally connected.

The longitudinally extending marginal portions 10 of the platform or upper wall 5 are coplanar and offset downwardly relative to the level of the platform, being connected with the latter by vertical webs 12 to define upwardly opening recesses 13 along the opposite upper, longitudinally extending sides of the tunnel.

Disposed within these recesses 13 and extending longitudinally thereof are the upper, parallel, horizontally spaced and horizontally extending upper runs of a pair of endless chains 14, 15 (FIG. 4).

Chains 14, 15 extend over pairs 16, 17 of sprocket wheels that are respectively secured on shafts 18, 19 positioned within the ends of the endless chains 14, 15 (FIG. 5).

The said shafts 18, 19 are supported for rotation in bearings 20, 21 that may be outside the ends of the tunnel through which the conveyor chains extend, said bearings being mounted on rigid supports 23, 24 rigidly positioned within cavities 25, 26 formed in the ground or concrete beyond the ends of the tunnel 6, and the upper open sides of said cavities are covered with plates 27, 28 which are extensions of the platform 5.

Any suitable take-up means, such as screws 30 (FIGS. 3, 5) may be provided for bearings 21 to move the latter in order to take up the slack in the chains 14, 15.

A sprocket wheel is secured on shaft 18, which wheel is connected by a chain 33 (FIG. 3) with a sprocket wheel on the driven shaft 34 of gear reduction unit 35, which unit, in turn, is connected with a motor 36 through a variable speed drive generally designated 37.

The shaft 18 is rotated by motor 36 in a direction for moving the upper runs of chains 14, 15 from left to right as seen in the drawings.

A plurality of rollers 38 spaced apart longitudinally of the chains 14, 15 and extending between the latter are carried by said chains. A shaft rotatably mounting each roller is carried at its ends in lugs 39 that are offset outwardly of the chains (upwardly on the upper runs of the chains and downwardly on the lower runs). As best seen in FIG. 2 the lugs on chain 14, which chain is adjacent to the guide rail 44, are not directly opposite to the lugs on chain 15 but slightly lead the lugs on chain 15 so that the axis of rotation 40 of each roller 38 is at an angle relative to a line 41 that is perpendicular or at right angles to the chains. This angle may be relatively slight, as seen in FIG. 2.

Along and elevated above the chain 14, and also parallel with the upper run of said chain, is a rigid guide rail or strip 44. This guide rail, as seen in FIG. 4, may be the upper marginal portion of an upward extension of the wall 7 of the tunnel 6, which marginal portion is adjacent to the nearest ends of rollers 38 on the upper rims of chains; and it is relatively narrow.

Actually, it has been found satisfactory to position the guide rail 44 over wheels 45 that are mounted on one of the ends of the shafts carrying rollers 38. These wheels 45 are between the chain 14 and the rollers, and corresponding wheels 46 are at the opposite ends of said shafts. Wheels 45, 46 are rotatably carried on platform 5 for supporting the rollers 38 slightly spaced above said platform for movement longitudinally of the latter.

The bottom wall 9 of the tunnel 6 extends the major length of the chains 14, 15 and is relatively close to the upper level of floor 3.

The end recesses or cavities 25, 26 are deeper, since these receive the sprocket wheels 16, 17 and cavity 25 also may have the motor 36 and the drive mechanisms connecting it with the sprockets 16 thereon.

One end 47 of the lower wall 9 may project into cavity 26, and incline downwardly to carry wheels 45, 46 downwardly from bottom wall 9 into cavity 26 toward sprocket wheels 17, while the end portion 48 of bottom wall 9 extends downwardly from said wall into cavity 25 for supporting wheels 45, 46 for carrying the rollers into the tunnel 6 from the lower sides of sprocket wheels 16.

The excavation for the tunnel and the cavities at its ends may be in the ground and lined with concrete, as indicated, or may be formed with concrete.

From the foregoing it will be seen that the installation of the apparatus described requires only one excavation, the major portion of which is a single relatively shallow ditch or channel with deeper cavities 25, 26 at its ends. The tunnel 6 is positioned in the shallow central portion of the channel, in which case the platform 5 will extend substantially to the sprocket wheels 16, 17.

Plate 28 is swingably mounted at its end remote from sprocket wheels 17 on a shaft or pivot means 50 for swinging upwardly under the upward force of the wheels 45, 46 carrying rollers 38 as the latter are carried upwardly over sprocket wheel 17. At the opposite end of the conveyor, a wheel mounted plate 51 is yieldably retained, by a weight 52 in a position substantially closing the gap 53 between the plate 51 and the end of the platform 5 adjacent thereto. A cable, cord or chain, extending over suitable pulleys, connects with the wheel mounted plate 51 for moving the plate to gap closing position, and the roller and wheels 45, 46 mounting the same will urge the plate 51 to open position permitting each roller to pass downwardly into cavity 25 and around sprocket wheels 16.

At this point it may be mentioned that the apparatus, assembled as a unit, which includes the tunnel, ramps 47, 48, sprocket wheels, bearings and supports therefor, may be assembled at a site remote from the base concrete structure formed to receive it, and installed as a unit. The rail 44, of course, is included as an integral part of the structure.

The rollers 38 may be termed "pushers" or "pusher rollers," since they function to push against one of the front wheels of the automobile 1.

Where the word "wheels" is used it is intended to include the tire.

In operation, the automobile 1 is moved to a position in which wheels 4 are on platform 5 with the front wheel 4 ahead of one of the rollers 38. These rollers are so spaced apart that none of them will be under rear wheel 4 of the automobile when one is in engagement with the front wheel 4, and the automobile is positioned so that a roller will move into engagement with the front wheel 4 as the conveyor is actuated; and in which position the front wheel 4 is spaced from rail 44 when the steering wheels are straight relative to the longitudinal axis of the automobile and to rail 44.

The front wheels are then turned so that one of them, (in the illustration it is the front wheel 4) engages the rail at point 55, which point is at the lower, forward, generally laterally directed side of the tire (FIG. 2).

When wheel 4 is in the above described position, the axis of rotation 56 of the wheel is at one side of a line perpendicular to rail 44, while the roller 38 that engages the rear lower side of the wheel and its axis of rotation 40 is at the opposite side of said line.

Under the above condition, when the roller 38 moves forwardly along a path parallel with the rail 44 the fact that it is pushing against the shoulder of tire 4 at point 58, which is at the same side of the tire as point 55, the wheel 4 will be held in engagement with the rail 44 at point 55 while the roller 38 pushes the automobile forwardly.

From the foregoing explanation, it is seen that the method employed in the present invention to move an automobile forwardly and to guide it along a path of travel extending longitudinally of the automobile during its forward movement, is to position the steering wheels at an angle relative to said path of travel, or to the longitudinal axis of the automobile and into slidable engagement with a smooth, fixed surface extending longitudinally of said path at a point on the lower, forward, laterally facing side of said wheel that is at the side of said wheel to which it is turned, and to push said wheel forwardly by a pushing force applied in a direction parallel with said path to the rear portion of said wheel at the corner that is at the same side of said wheel as the said point of engagement of the lateral side of said wheel with said surface.

Usually the rail and platform 5 are wet, as in automobile laundries, hence there is no noticeable wear or chafing of the tire that engages the rail 44. The relation between the wheel 4 and rail 44 and roller 38 precludes any possibility of the steering wheels straightening, during pushing of the automobile.

It will be obvious to those skilled in the art that various changes may be made without departing from the spirit of the invention and therefore the invention is not limited to what is shown in the drawings and described in the specification, but only as indicated in the appended claims.

I claim:

1. The method of moving and guiding an automobile having steering ground wheels, in a forward direction along a path of travel that is substantially parallel with the longitudinal axis of said automobile that comprises the steps of; turning its said steering wheels at an angle relative to said longitudinal axis and positioning one of said wheels into slidable engagement with a smooth fixed surface parallel with said axis at a point on the lower, forward, laterally facing side of said wheel, and pushing said wheel forwardly by a pushing force applied in a direction parallel with said path to the rear portion of said wheel at the corner of the latter that is at the same side of said wheel as said point of engagement of the lateral side of said wheel with said surface whereby said automobile will be moved forwardly in said direction and said wheel will be held at an angle to said longitudinal axis against said surface during said movement.

2. A conveyor for moving a vehicle having a horizontal longitudinal axis, and ground wheels supporting such vehicle for forward movement thereof in one direction longitudinally of said axis, and one of which ground wheels is a steering wheel swingable about a vertically extending axis, comprising; means providing an elongated, horizontally extending surface, adapted to support said steering wheel thereon when the longitudinal axis of said vehicle is parallel with the length of said surface; an elongated, horizontally extending rail rigid relative to said surface positioned at a level above that of said surface and alongside the latter adapted to be engaged by one side of said wheel at a point along its leading portion when said wheel is turned about said vertical axis toward said rail and for rotation of said wheel about a horizontal axis extending angularly relative to a horizontal line that extends at right angles to said rail, a pusher over said surface supported for movement in said one direction parallel with said rail having a steering wheel engaging face directed laterally away from said rail but generally in said one direction for moving said steering wheel and said vehicle in said one direction and for maintaining such wheel so turned and in engagement with said rail, and means for so moving said pusher.

3. A conveyor for moving an automobile having a horizontal, longitudinal axis, and ground wheels supporting said automobile for forward movement thereof in one direction along a path of travel parallel with said axis, and which ground wheels include a pair of steering wheels at one end of said automobile similarly swingable relative to said longitudinal axis about vertical axes, comprising; means providing a flat, horizontal surface adapted to support one of said steering wheels thereon for movement thereover in a direction parallel with the longitudinal axis of said automobile, an elongated rail extending horizontally alongside said surface, means supporting said rail rigid relative to said surface at a level spaced above that of said surface, and an endless, horizontally elongated conveyor means having upper and lower horizontally extending runs parallel with said rail that include horizontally extending rollers spaced apart in a direction lengthwise of said runs with the said rollers of the upper run of said conveyor means extending over said surface and at corresponding angles relative to said rail, means connected with said conveyor means for actuating the same for movement of said rollers in a forward direction parallel with said rail, said rollers being positioned with one of their ends adjacent to said rail, the angles of the rollers of said upper run being such that the ends of the rollers adjacent to said rail will lead the opposite ends of said rollers when said upper run is moved forwardly, said rollers of said upper run being adapted to engage the rear portion of said one of said steering wheels at one of the shoulders thereof when said one of said wheels is on said surface and is turned about its vertical axis into engagement of its forward lateral side against said rail.

4. In combination, a horizontally elongated, horizontal platform adapted to support the wheels at one side of an automobile thereon, which includes one of the ground engaging steering wheels, for movement thereover longitudinally of said platform, a roller rotatable about a horizontal axis positioned adjacent to and across said platform, means connected with said roller for moving the latter in one direction parallel with and longitudinally of said platform, a horizontally extending rail alongside said platform extending parallel therewith, means supporting said rail at a level above that of said platform at which level it is adapted to engage a generally laterally facing portion of the periphery of said one of the ground engaging steering wheels when the latter is on said platform spaced from said rail and turned into such engagement with said rail, said rail being adjacent to one end of said roller, and said roller being positioned at an angle relative to said rail with said one end leading the other end of said roller when said roller is moved in said one direction and when said one steering wheel is ahead of and in engagement with said roller and in engagement with a point on said rail ahead of said roller, whereby such steering wheel will be maintained in engagement with said wheel at said point.

5. A conveyor for moving an automobile along a horizontal path of travel, a horizontally extending open-ended tunnel comprising a top plate, a bottom plate and opposed side plates connected to provide top, bottom and lateral sidewalls, said top and bottom plates being relatively close together, and a horizontal shaft supported for rotation outwardly of opposite open ends of said tunnel disposed at right angles to the length of said tunnel, a pair of spaced sprocket wheels secured to each of said shafts, the sprocket wheels of each pair thereof being equally spaced apart and correspondingly positioned opposite to the open ends of said tunnel, endless chains connecting corresponding sprockets of said pairs, rollers extending between and connected to said chains for movement over and substantially in engagement with the upper surface of said upper plate in pushing relation to a wheel on such automobile upon rotation of one of said shafts in one direction, said sprocket wheels being substantially greater in diameter than the distance between said upper and lower plates, means connected with said tunnel supporting said shafts in positions in which the upper runs of said chains at the uppermost sides of said sprocket wheels are adjacent to the level of said upper plate and in which the lower runs of said chains extend through said tunnel supported on said bottom plate whereby an excavation for positioning said tunnel with said upper plate at the surface of the ground will require only a relatively shallow excavation for said tunnel and two deeper excavations at the ends of said tunnel for said wheels, and the means mounting them.

6. A conveyor for moving an automobile along a horizontal path of travel, a horizontally extending open-ended tunnel comprising a top plate, a bottom plate and opposed side plates connected to provide top, bottom and lateral sidewalls, said top and bottom plates being relatively close together, and a horizontal shaft supported for rotation outwardly of opposite open ends of said tunnel disposed at right angles to the length of said tunnel, a pair of spaced sprocket wheels secured to each of said shafts, the sprocket wheels of each pair thereof being equally spaced apart and correspondingly positioned opposite to the open ends of said tunnel, endless chains connecting corresponding sprockets of said pairs, rollers extending between and connected to said chains for movement over and substantially in engagement with the upper surface of said upper plate in pushing relation to a wheel on such automobile upon rotation of one of said shafts in one direction, said sprocket wheels being substantially greater in diameter than the distance between said upper and lower plates, means connected with said tunnel supporting said shafts in positions in which the upper runs of said chains at the uppermost sides of said sprocket wheels are adjacent to the level of said upper plate and in which the lower runs of said chains extend through said tunnel supported on said bottom plate whereby an excavation for positioning said tunnel with said upper plate at the surface of the ground will require only a relatively shallow excavation for said tunnel and two deeper excavations at the ends of said tunnel for said wheels, and the means mounting them, said bottom plate including ramps extending slantingly downwardly from its opposite ends for supporting the lower runs of said chains and the rollers connected thereto during movement thereof to and from said sprocket wheels respectively.

7. A conveyor for moving an automobile along a horizontal path of travel, a horizontally extending open-ended tunnel comprising a top plate, a bottom plate and opposed side plates connected to provide top, bottom and lateral sidewalls, said top and bottom plates being relatively close together, and a horizontal shaft supported for rotation outwardly of opposite open ends of said tunnel disposed at right angles to the length of said tunnel, a pair of spaced sprocket wheels secured to each of said shafts, the sprocket wheels of each pair thereof being equally spaced apart and correspondingly positioned opposite to the open ends of said tunnel, endless chains connecting corresponding sprockets of said pairs, rollers extending between and connected to said chains for movement over and substantially in engagement with the upper surface of said upper plate in pushing relation to a wheel on such automobile upon rotation of one of said shafts in one direction, said sprocket wheels being substantially greater in diameter than the distance between said upper and lower plates, means connected with said tunnel supporting said shafts in positions in which the upper runs of said chains at the uppermost sides of said sprocket wheels are adjacent to the level of said upper plate and in which the lower runs of said chains extend through said tunnel supported on said bottom plate whereby an excavation for positioning said tunnel with said upper plate at the surface of the ground will require only a relatively shallow excavation for said tunnel and two deeper excavations at the ends of said tunnel for said wheels, and the means mounting them, one of said sidewalls being positioned alongside one of said chains and said one of said sidewalls having an upward extension projecting above the level of the rollers on said upper plate to provide a guide rail for engagement by one of the wheels of an automobile on said upper plate.

8. A conveyor for moving in one direction an automobile having a leading pair of spaced opposed steering ground wheels rotatable about horizontal axes and connected for simultaneous rotation about vertical axes respectively adjacent to each wheel, comprising: a horizontally elongated guide rail extending in said one direction; means supporting said guide rail rigid extending in said one direction in a position adapted to be engaged by a generally laterally facing side of one wheel of said pair adjacent to its leading side when said pair of wheels are turned about said vertical axes to positions in which their horizontal axes are disposed at less than a right angle to said rail; a pusher adapted to engage the trailing portions of said one wheel at a point adjacent to the side thereof that is adapted to engage said rail when said wheels are so turned to said positions; means connected with said pusher for moving the latter in said one direction whereby said one wheel of said pair will be held against said rail and said automobile will be moved in said one direction; the laterally projected area at the side of said rail facing the other wheel of said pair being unobstructed for free movement of such other wheel at different distances from said rail whereby automobiles having different wheel gauges may be moved by said pusher independently of another pusher and guide rail and like means, and the laterally projected area at the side of said rail adapted to engage said one wheel being substantially unobstructed to the level of the lowermost portion of the wheel adapted to be engaged by said pusher.

9. The method of moving in one direction along a horizontally extending path of travel an automobile having its longitudinal, horizontal axis parallel with said path, and having a pair of spaced, opposed, leading, steering ground wheels having inflated pneumatic tires thereon, and rotatable about horizontal axes and connected for simultaneous corresponding free movement about vertical axes respectively adjacent to each wheel, that comprises the steps of: pushing one wheel of said pair in said one direction at a point on its trailing portion below its axis of rotation and adjoining one laterally facing side of the tire on said wheel with the leading portions of said one wheel turned generally toward said horizontal axis of said automobile and slidably engaging said one laterally facing side only of the tire on said one wheel at the forward portion of said wheel against a stationary surface extending in said one direction leaving the side of said tire opposite to said one laterally facing surface free and fully exposed substantially to the lowermost point on said tire whereby said vehicle will be moved in said one direction and said one wheel will be maintained in its slidable engagement with said tire on said surface.

References Cited in the file of this patent

UNITED STATES PATENTS

| | | |
|---|---|---|
| 2,107,465 | Borggaard | Feb. 8, 1938 |
| 2,468,303 | Merritt | Apr. 26, 1949 |

FOREIGN PATENTS

| | | |
|---|---|---|
| 529,157 | Great Britain | Nov. 14, 1940 |